(12) United States Patent
Scheuing et al.

(10) Patent No.: US 10,001,390 B2
(45) Date of Patent: Jun. 19, 2018

(54) REDUNDANT SIGNAL CAPTURE

(71) Applicant: Robert Bosch GmbH, Stuttgart (DE)

(72) Inventors: Jan Scheuing, Brackenheim (DE);
Siegbert Steinlechner, Leonberg (DE);
Jo Pletinckx, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 365 days.

(21) Appl. No.: 14/649,827

(22) PCT Filed: Oct. 15, 2013

(86) PCT No.: PCT/EP2013/071494
§ 371 (c)(1),
(2) Date: Jun. 4, 2015

(87) PCT Pub. No.: WO2014/090445
PCT Pub. Date: Jun. 19, 2014

(65) Prior Publication Data
US 2016/0069714 A1    Mar. 10, 2016

(30) Foreign Application Priority Data

Dec. 11, 2012 (DE) .................. 10 2012 222 724

(51) Int. Cl.
| | |
|---|---|
| G01D 18/00 | (2006.01) |
| G01P 21/00 | (2006.01) |
| G01D 3/08 | (2006.01) |
| G01D 5/244 | (2006.01) |
| G01P 15/18 | (2013.01) |
| G01P 15/08 | (2006.01) |

(52) U.S. Cl.
CPC ............. G01D 18/00 (2013.01); G01D 3/08 (2013.01); G01D 5/24461 (2013.01); G01P 15/18 (2013.01); G01P 21/00 (2013.01); *G01P 15/08* (2013.01)

(58) Field of Classification Search
CPC .......... G01D 18/00; G01D 3/08; G01P 15/18
USPC ...................................................... 702/104
See application file for complete search history.

(56) References Cited

U.S. PATENT DOCUMENTS

| | | | |
|---|---|---|---|
| 5,363,303 A | 11/1994 | Kaneko et al. | |
| 5,375,468 A | 12/1994 | Ohta et al. | |
| 6,023,664 A * | 2/2000 | Bennet | B60R 21/0132 701/45 |

(Continued)

FOREIGN PATENT DOCUMENTS

| | | |
|---|---|---|
| CN | 101517419 A | 8/2009 |
| CN | 102706505 A | 10/2012 |

(Continued)

*Primary Examiner* — Gregory J Toatley
*Assistant Examiner* — Terence Stifter, Jr.
(74) *Attorney, Agent, or Firm* — Norton Rose Fulbright US LLP; Gerard Messina

(57) ABSTRACT

A sensor system for furnishing a D-dimensional measured signal encompasses at least N sensors (where D<N) sensors that have measurement directions linearly independent of one another; a stimulus source for furnishing a periodic stimulus signal for each of the sensors, the stimulus signals having mutually orthogonal frequencies; and a processing device for removing the stimulus signals from the sensor signals and for furnishing the D-dimensional measured signal.

4 Claims, 4 Drawing Sheets

(56) References Cited

U.S. PATENT DOCUMENTS

| | | | |
|---|---|---|---|
| 6,298,709 B1 | 10/2001 | Artzner et al. | |
| 6,462,530 B1 * | 10/2002 | Layton | G01C 19/5607 |
| | | | 324/76.49 |
| 7,086,270 B2 * | 8/2006 | Weinberg | G01D 3/08 |
| | | | 73/1.38 |
| 7,516,038 B2 * | 4/2009 | Lehtonen | G01P 15/18 |
| | | | 702/141 |
| 2013/0263660 A1 * | 10/2013 | Shibata | G01C 19/56 |
| | | | 73/504.02 |

FOREIGN PATENT DOCUMENTS

| | | |
|---|---|---|
| DE | 197 39 903 | 4/1999 |
| EP | 0 523 732 | 1/1993 |
| WO | WO 98/19171 | 5/1998 |

\* cited by examiner

REDUNDANT SIGNAL CAPTURE

FIELD OF THE INVENTION

The present invention relates to a sensor for signal sensing. The invention relates in particular to a redundant sensor and to a technique for evaluating the sensor signal.

BACKGROUND INFORMATION

In safety-relevant systems it is important to promptly detect faulty behavior of the sensors used for signal sensing, or of their signal paths. In a motor vehicle this relates, for example, to an acceleration sensor that is used to control airbag systems or vehicle stability systems.

The fault detection mechanisms usually used in the sensor are based substantially on the principle of redundancy or on that of stimulus.

With a redundant measurement, the measured variable is usually sensed using at least one additional sensor whose expected signal can be calculated by a non-trivial linear combination of all other measured signals, the sensing and evaluation of said signal occurring as independently as possible. It is assumed in this context that the sensors are approximately linear and time-invariant. Faulty behavior by one of the sensors being used is then detected on the basis of a significant deviation from the linear correlation for measured signals. The method has the disadvantage, in particular with offset-free or offset-corrected signals, that e.g. gain errors in the signal sensing system can be detected only when a measured variable is present. When the measured variable has a value of zero, a gain error is not detectable from the linear correlation of the redundancy.

Patent document U.S. Pat. No. 7,516,038 B2 presents an example of redundant evaluation of signals of an acceleration sensor. For a horizontally oriented vehicle a gain error of a sensor measuring in the horizontal plane cannot be detected here on the basis of redundancy.

With the stimulus principle, the measured variable furnished by the sensor element is overlaid with a known stimulus signal with which the measurement channel can be checked. The difficulty lies in distinguishing the effects of the stimulus signal and usable signal on the sensed signal, especially if the measurement channel cannot be modeled with sufficient accuracy and if time-related separation is not possible due to continuous sensor sensitivity, and if frequency separation is not possible because of the measurement channel properties.

An example of an additional excitation of an acceleration sensor by an electrical signal may be gathered from DE 10 2010 029903 A1.

SUMMARY OF THE INVENTION

An object of the invention is to monitor a sensor for a safety-critical application with regard to failure or faulty measurement of a sensor element, and with regard to faults in a signal processing path. This monitoring may be intended to take place during ongoing operation, not to influence the measurement result, to be capable of occurring even without application of a measured variable, and to enable testing of the sensor in the frequency range of its usable signal. The invention achieves this object by way of a sensor, a method, and a computer program product having the features of the independent claims.

The sensor system according to the present invention for furnishing a D-dimensional measured signal encompasses at least N sensors (where D<N) that have measurement directions linearly independent of one another; a stimulus source for furnishing a periodic stimulus signal for each of the sensors, the stimulus signals having mutually orthogonal frequencies; and a processing device for removing the stimulus signals from the sensor signals and for furnishing the D-dimensional measured signal.

The invention utilizes a redundant sensor assemblage in which the individual measurement channels are excited by different, frequency-orthogonal stimuli. In other words, the stimulus signals are selected so that their spectra do not overlap. In a further embodiment, stimuli having orthogonal codes can also be used.

For frequency ranges that are not contained in any stimulus signal, redundancy is utilized in order to plausibilize the measured signals, and optionally additionally to reduce measurement noise. If a frequency is contained in the stimulus signal of a measurement channel, the measured value is ascertained at that frequency using redundancy, without the measurement channel in question.

The invention is advantageous as compared with an exclusively redundant measurement, since the measurement channels can be checked by way of stimuli even without application of a measured variable.

A substantial advantage of the invention is that a complete separation of signal and stimulus is possible without limiting the frequency response of the measured signal. The stimulus frequencies are subject only to an orthogonality condition, and consequently can even be located in the usable frequency range of the sensor. A particular advantage of the invention is that the signal to be measured experiences no delay. A further advantage is the possibility of actively checking the effectiveness of the fault detection mechanisms.

In a first embodiment the processing device encompasses a mixer for mixing the sensor signals; a stimulus filter for each sensor for filtering the stimulus signal out of the output signal of the mixer; a compensator for each sensor, which is connected to the sensor associated with it and to the corresponding stimulus filter, for compensating the sensor signal in proportion to the stimulus signal; and a redundancy reducer to furnish the output signal on the basis of the signals of the compensators.

Simple and efficient furnishing of the output signal can thereby be achieved. In addition, the sensors can be monitored on the basis of intermediate results from sections of the processing device.

In another embodiment the processing device encompasses a mixer for mixing the sensor signals; a stimulus filter for each sensor for filtering the stimulus signal out of the output signal of the mixer; a first redundancy reducer for determining a first signal on the basis of the signals of the stimulus filters; a second redundancy reducer for determining a second signal on the basis of the sensor signals; and a compensator for removing the stimulus signals and for furnishing the output signal on the basis of the signals of the two redundancy reducers.

In yet another embodiment the processing device encompasses a redundancy reducer for determining a first signal on the basis of the sensor signals; a stimulus blocking filter that is connected downstream from the redundancy reducer; a partial combiner for each of the sensors, each for combining two sensor signals; a stimulus filter for each partial combiner; and a signal reconstructer for furnishing the output signal on the basis of the signals of the stimulus filters and of the stimulus blocking filter.

Each of the above-described embodiments of the processing device can also be realized in the form of a method. For example, the first embodiment can be implemented by a method that encompasses steps of: stimulating each sensor with a periodic stimulation signal having a predetermined stimulation frequency, the stimulation frequencies of the sensors being orthogonal to one another; mixing the sensor signals;

filtering the stimulation signal of each sensor out of the mixed sensor signal; compensating each sensor signal and in proportion to the filtered-out stimulation signal; reducing the redundancy of the compensated sensor signals; and furnishing the output signal. Corresponding methods can be described for the other two embodiments for the processing device.

A computer program product according to the present invention encompasses a program code arrangement having program code for carrying out one of the methods when the computer program product executes on a processing device or is stored on a computer-readable data medium.

The invention will now be explained in further detail with reference to the appended Figures.

DETAILED DESCRIPTION OF THE DRAWINGS

DETAILED DESCRIPTION

Figure 1:
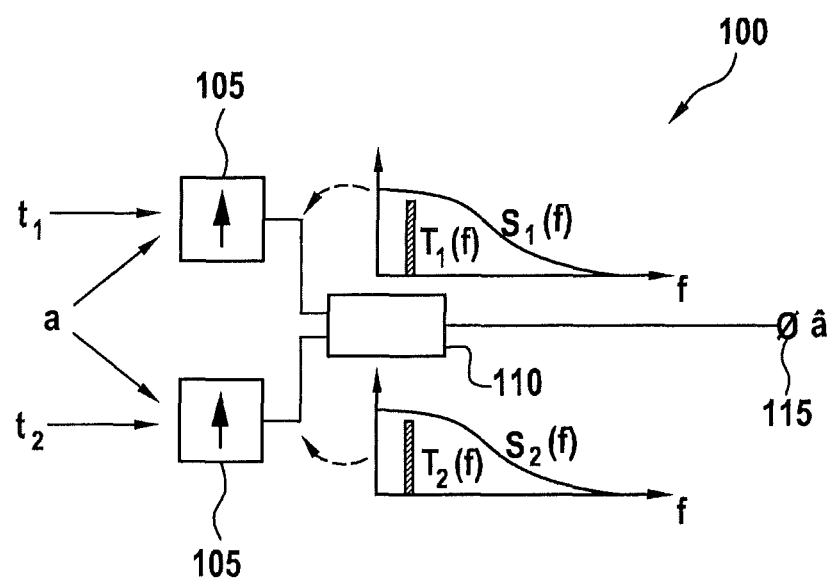
FIG. 1 is a block diagram of a redundant, stimulatable sensor system.

FIG. 1 shows a redundant sensor system 100 made up of N (where $N \in \{2, 3, 4, \ldots\}$) sensors 105 with which a D-dimensional (where D<N) measured variable a acting externally on the sensor is to be sensed. The sensor signals are processed by way of a processing device 110, and the value of the measured variable a is reproduced at output 115 of sensor system 100 in the form of a measured value â. For this, each sensor is excited with a periodic stimulus signal $t_i$, the stimulus signals $t_i$ having mutually orthogonal frequencies as will be discussed in further detail below. Spectrograms sketched at the outputs of sensors 105 each present a distribution of intensities against the frequencies of the sensor signal, the stimulus signals $t_i$ being highlighted.

The sensor signals will be regarded hereinafter, by way of example, as time-discretized, and the sampling time is reproduced by an index n; this serves, however, only for explanation, and does not represent any limitation of the technology being presented. It is further assumed that each sensor 105 possesses a sufficiently wide dynamic range, and behaves in approximately linear and time-invariant fashion.

The sensor signals $s_i$ to be measured (where $1 \le i \le N$) of a redundant sensor system with no stimulus can be described as $$\begin{pmatrix} s_1 \\ \vdots \\ s_N \end{pmatrix} = M \cdot a \qquad \text{(equation 1)}$$

the sensor assemblage being reproduced by a system matrix M. The case of a trivial sensor, in which one row of the matrix M contains exclusively the value 0, is presumed to be excluded. In the special case of a dimension D=1 of the measured variable, M represents a vector. The matrix M describes the factors with which the components of the measured variable a act on the individual sensors. The matrix M is determined substantially by the geometric disposition. This is measured by the signal distorted by the sensor transfer function $g_i$ $$\hat{s}_i = g_i(s_i) \qquad \text{(equation 2)}$$

where, for example, $g_i(x) = \alpha_i \cdot x + \beta$.

If the measured value â is ascertained from the sensor signals using, for example, a least-squares method, the pseudoinverse $M^+$ of the matrix M is then used to estimate the measured value:

$$\hat{a} = M^+ \cdot \begin{pmatrix} \hat{s}_1 \\ \vdots \\ \hat{s}_N \end{pmatrix}, \text{ where } M^+ = (M^T M)^{-1} M^T. \qquad \text{(equation 3)}$$

The measurement can be plausibilized based on an error term e that reproduces the linear dependence among the redundantly sensed sensor signals in the form of geometry-dependent weighting factors $k_i$:

$$e = \sum_{i=1}^{N} k_i \cdot \hat{s}_i \stackrel{!}{=} 0, \qquad \text{(equation 4)}$$

or $|e| < \delta$ in consideration of noise for an acceptance threshold $\delta > 0$. In general, up to N−D different linear dependences are possible, and consequently multiple error terms can also be checked.

In the case of the least-squares method, e is defined by $$\begin{pmatrix} \vdots \\ e \\ \vdots \end{pmatrix} = \begin{pmatrix} \hat{s}_1 \\ \vdots \\ \hat{s}_N \end{pmatrix} - MM^+ \begin{pmatrix} \hat{s}_1 \\ \vdots \\ \hat{s}_N \end{pmatrix}. \qquad \text{(equation 5)}$$

The sensors are stimulated with periodic signals, so that the sensor signals $\tilde{s}_i$ are each overlaid with a periodic stimulus signal $t_i$:

$$\begin{pmatrix} \tilde{s}_1 \\ \vdots \\ \tilde{s}_N \end{pmatrix} = M \cdot a + \begin{pmatrix} t_1 \\ \vdots \\ t_N \end{pmatrix}. \qquad \text{(equation 6)}$$

Figure 2:
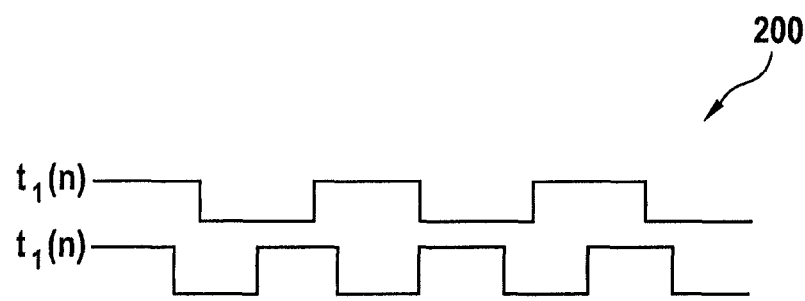
FIG. 2 shows an example of two frequency-orthogonal stimulation signals.

FIG. 2 shows examples of stimulus signals $t_i$ for sensor system 100 according to FIG. 1. The stimulus signals $t_i$ are each selected so that they lie within the usable frequency range of sensor 105, and the spectra of the stimulus signals $t_i$ do not mutually overlap. In other words, no common frequency lines exist, i.e. the frequencies are orthogonal to one another. In terms of implementation complexity for both signal generation and signal filtering, the stimulus signals $t_i$ may be square-wave, symmetrical, and average-free signals, for example having an identical amplitude v on the order of 5 to 10 percent of the dynamic range:

$$t_i(n) = \begin{cases} +v, n \in \left[0, \frac{f_A}{2f_i}\right] \\ -v, n \in \left[\frac{f_A}{2f_i}, \frac{f_A}{f_i}\right] \end{cases} \quad \text{(equation 7)}$$

where $f_A$ denotes the sampling frequency and $f_i$ the associated square-wave frequency, and $$\frac{f_A}{2f_i}$$

may be selected to be a whole number. The phase relationship among the square-wave signals is immaterial. The frequency orthogonality can be achieved by the fact that no odd-numbered multiples of the square-wave frequencies coincide; for this, which may be the following frequency ratios are selected:

N=2: $f_1:f_2$=2:3
or $f_1:f_2$=2:4
or $f_1:f_2$=3:4
N=3: $f_1:f_2:f_3$=2:3:4
or $f_1:f_2:f_3$=3:4:6
or $f_1:f_2:f_3$=4:5:6
N=4: $f_1:f_2:f_3:f_4$=4:6:7:8

For N=3, for example, at a sampling frequency $f_A$=600 Hz the square-wave frequencies $f_1$=150 Hz, $f_2$=100 Hz, and $f_3$=75 Hz can be selected.

Figure 3:
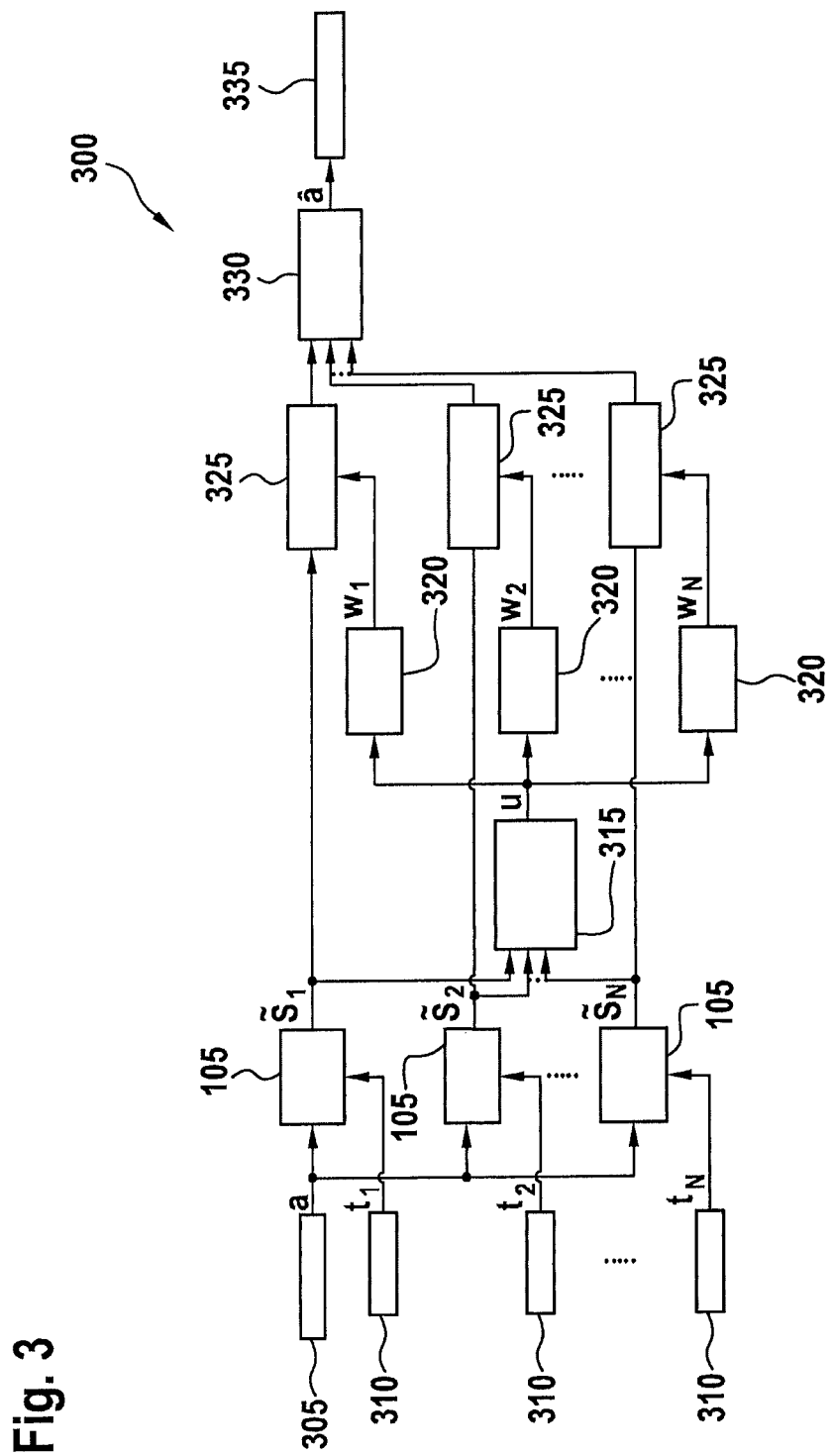
FIG. 3 shows a signal flow in the sensor system of FIG. 1.

FIG. 3 shows a signal flow in sensor system 100 of FIG. 1. An external signal source 305 furnishes the measured variable a, and stimulus sources 310 furnish stimulus signals $t_i$. The measured variable a, and one of the stimulus signals $t_i$ act on each sensor 105. In order to remove the stimulus components from the sensor signals, the sensor signals $\tilde{s}_i$ are combined, using a mixer 315 analogous to equation (4), to yield a signal u(n):

$$u(n) = \sum_{i=1}^{N} k_i \cdot \tilde{s}_i(n). \quad \text{(equation 8)}$$

In the zero-noise case and with fault-free sensors ($\alpha_i$=1, $\beta_i$=0), this combination signal u(n) contains exclusively the stimulus signals $t_i$ weighted with $k_i$:

$$u(n)|_{\alpha_i=1,\beta_i=0} = \underbrace{\sum_{i=1}^{N} k_i \cdot s_i(n)}_{0} + \sum_{i=1}^{N} k_i \cdot t_i(n). \quad \text{(equation 9)}$$

The combination signal u(n) is directed to a series of N stimulus filters 320 that are pass filters for the respectively matching stimulus frequencies of a channel, the filter length may be selected so that it corresponds to the common period length of the stimulus sequences. Stimulus filters 320 may be implemented as a digital filter bank using finite impulse response (FIR) filters. The gain of a stimulus filter is designated $l_i$.

The output of each stimulus filter 320 and an output of the corresponding sensor 105 are sent to a compensator 325 that, by adding the respective sensor signal $\hat{s}_i(n)$ and the matching filter output signal $w_i(n)$, weighted with $$-\frac{1}{k_i \cdot l_i},$$

in each channel, completely compensates for the stimulus component $t_i(n)$, since $w_i(n)$ represents a time-delayed variant, optionally averaged over multiple stimulus periods, of $k_i t_i(n)$.

Based on the sensor signals compensated in proportion to the stimuli, the measured value â is estimated in a redundancy reducer 330 analogously to equation (2), and outputted at output 335.

Figure 4:
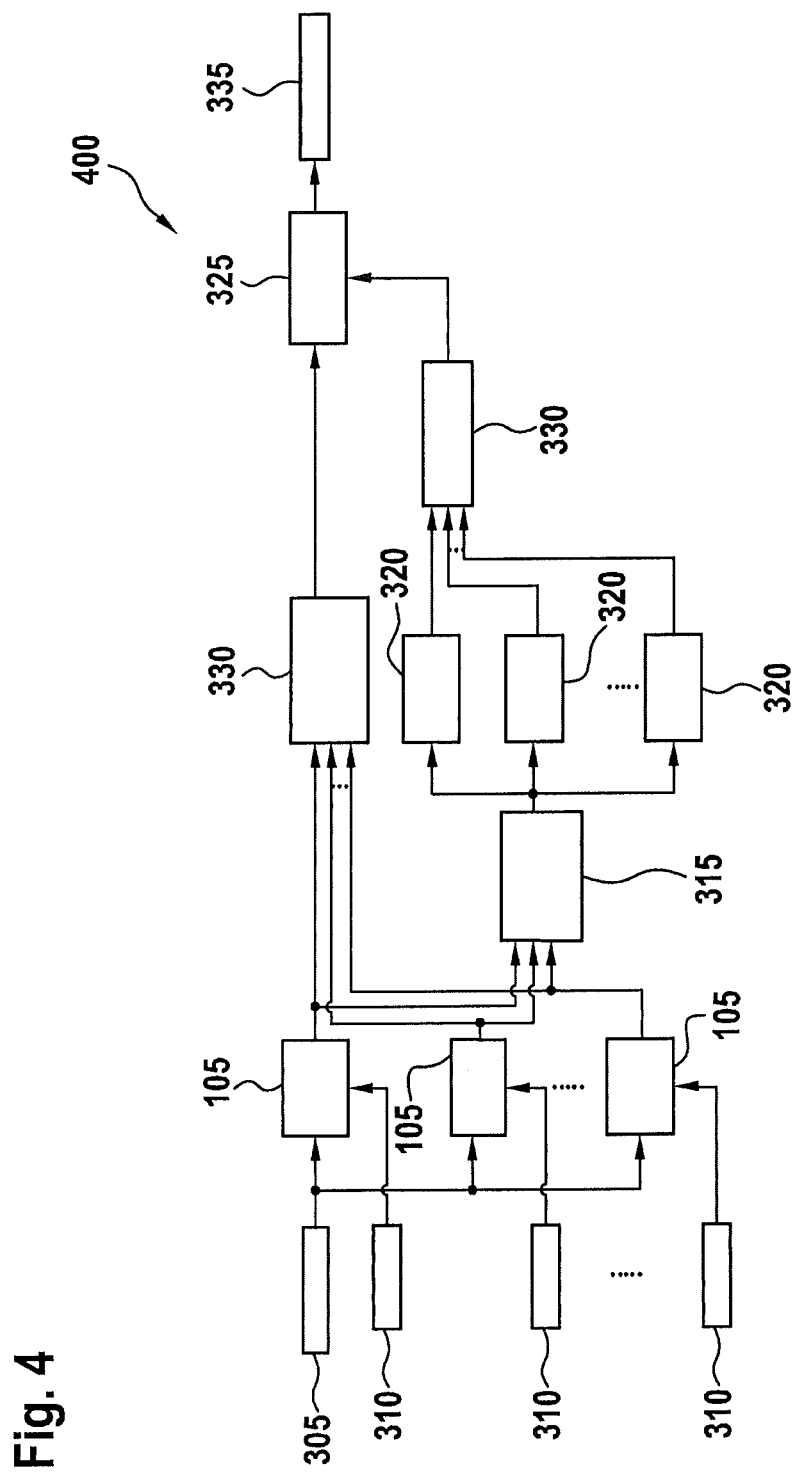
FIG. 4 shows an alternative signal flow in the sensor system of FIG. 1.
Figure 5:
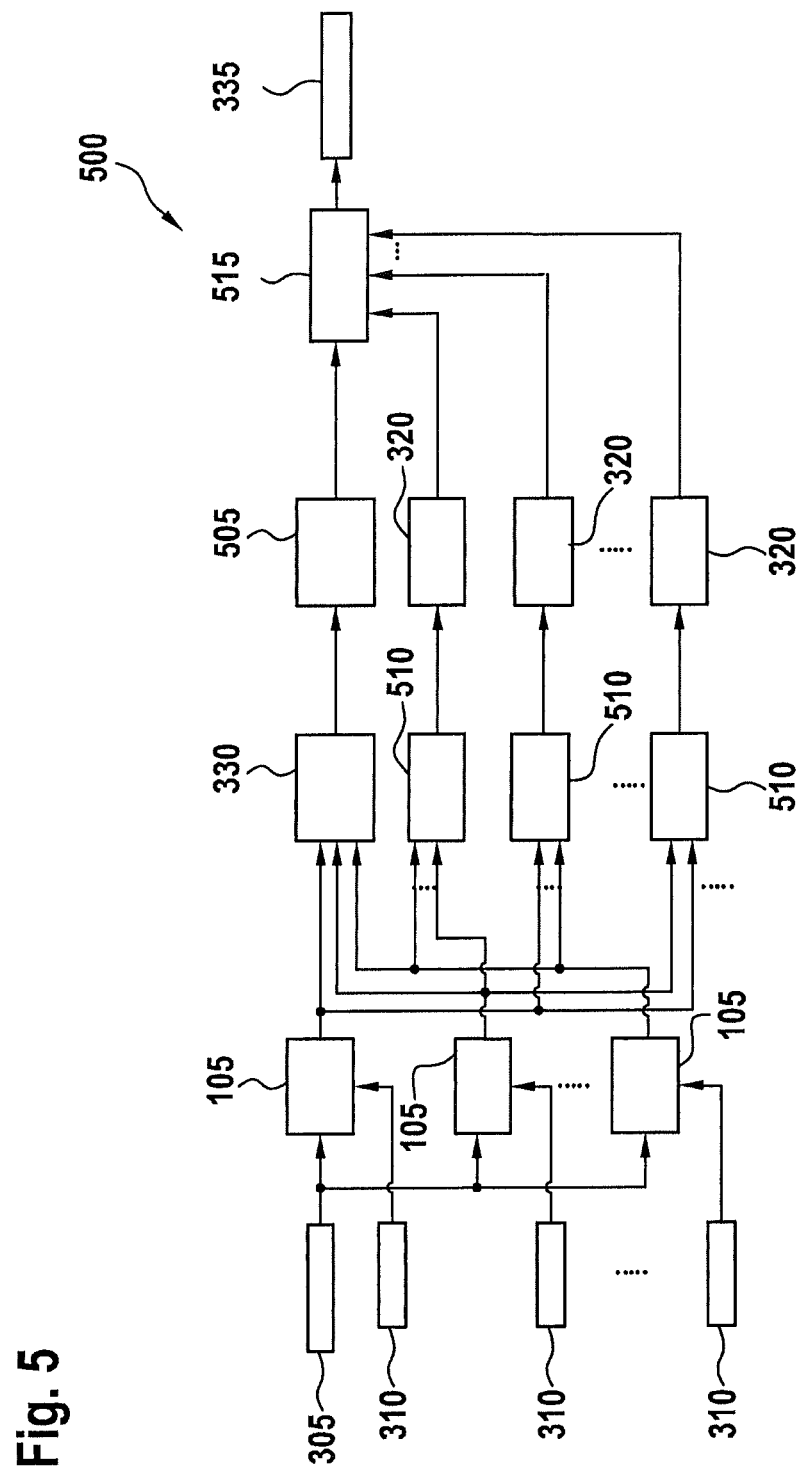
FIG. 5 shows a further alternative signal flow in the sensor system of FIG. 1.

FIGS. 4 and 5 show, by way of example, equivalent structures that result from transposing the sequence of linear operations of the structure in FIG. 3.

FIG. 4 shows an alternative signal flow in sensor system 100 of FIG. 1. In contrast to the embodiment depicted in FIG. 3, here the outputs of stimulus filters 320 are sent not to compensators 325 but instead to redundancy reducer 330. In addition, the output signals of sensors 105 are furnished to a further redundancy reducer 330. The output signals of the two redundancy reducers 330 are sent to a compensator 325 that furnishes the output signal.

FIG. 5 shows yet another alternative signal flow in sensor system 100 of FIG. 1. This embodiment differs from the one shown in FIG. 3 in that the sensor signals of all sensors 105 are directed to one redundancy reducer 330, whose output is connected to a stimulus blocking filter 505. In addition, a partial combiner 510 is furnished for each of sensors 105. Each partial combiner 510 is connected to the sensor signals of two sensors 105, each combiner evaluating a different combination of sensor signals. The output of each combiner 510 is connected to a dedicated stimulus filter 320, and the outputs of stimulus filters 320 and the output of stimulus blocking filter 505 are sent to a signal reconstructer 515 that furnishes the signal at output 335.

Several monitoring functions are made possible by the combination according to the present invention of redundancy and stimulus:

- The output signals of stimulus filters $w_i(n)$ can be used for a determination (time-offset by an amount equal to the filter transit time) of the sensor gain $\alpha_i$, for example at the stimulus frequency or by offset estimation.
- Alternatively to offset estimation, sustained absence of an output signal $w_i(n)$ of the stimulus filter (or a slow decay in its amplitude) indicates a defect in generation of the stimulus or in the sensor element or the downstream evaluation circuit.
- By subtracting all the filter output signals it is possible to generate from the combination signal u(n) a likewise zero-transit-time error signal $$\tilde{e}(n) = u(n) - \sum_{i=1}^{N} w_i(n) \quad \text{(equation 10)}$$

that corresponds, leaving aside the stimulus frequencies, to the error signal according to equation (4). When a measurement variable is present, this signal can additionally be used for plausibilization by testing the linear dependence of the redundancy, for example with a threshold value comparison:

$$|\tilde{e}(n)| < \delta. \quad \text{(equation 11)}$$

Thanks to the storage property of the filters, defects that result in a rapid change (within the filter transit time) in the sensor transfer function g(x) become visible in ẽ(n), in addition to monitoring of the sensor gain and even in the absence of a measured variable.

Weighted summing of the combination signal u(n) makes a determination or monitoring of the sensor gain possible even before filtering; what is critical here is not the entire filter transit time but only the common period duration of stimuli of the other channels.

A weighting of the signal components which differs from $k_i$, for example an adaptively corrected one, is likewise possible, optionally including in a parallel monitoring path that has no effect on the measured value path.

What is claimed is:

1. A sensor system for furnishing a D-dimensional measured signal, comprising:
   N sensors that have measurement directions linearly independent of one another, wherein D<N;
   at least one calculated sensor signal whose expected signal may be calculated by a non-trivial linear combination of all other measured signals;
   a stimulus source for furnishing a periodic stimulus signal for each of the sensors, the stimulus signals having mutually orthogonal frequencies; and
   a processing device for removing the stimulus signals from the sensor signals and for furnishing the N-dimensional measured signal;
   wherein the processing device includes:
      a mixer for mixing the sensor signals;
      a stimulus filter for each of the sensors for filtering the stimulus signal out of the output signal of the mixer;
      a compensator for each of the sensors, which is connected to the sensor associated with it and to the corresponding stimulus filter, for compensating the sensor signal in proportion to the stimulus signal; and
      a redundancy reducer for furnishing the output signal based on the signals of the compensators.

2. A method for determining a D-dimensional measured signal based on at least N sensor signals linearly independent of one another, wherein D<N, and a calculated sensor signal, which as expected may be calculated by a non-trivial linear combination of all other measured signals, the method comprising:
   stimulating each sensor with a periodic stimulation signal having a predetermined stimulation frequency, the stimulation frequencies of the sensors being orthogonal to one another;
   mixing the sensor signals;
   filtering the stimulation signal of each sensor out of the mixed sensor signal;
   compensating each sensor signal in proportion to the filtered-out stimulation signal;
   reducing the redundancy of the compensated sensor signals; and
   furnishing the output signal.

3. The method of claim 2, further comprising:
   determining a defect upon generation of the stimulus signal, in the sensor or a processing device for determining the output signal based on the sensor signals, if a stimulus filter for filtering the stimulation signal of each sensor out of the mixed sensor signal furnishes, for more than a predetermined length of time, no output signal having a predetermined amplitude.

4. A computer readable medium having a computer program, which is executable by a processor, comprising:
   a program code arrangement having program code means for determining a D-dimensional measured signal based on at least N sensor signals linearly independent of one another, wherein D<N, and a calculated sensor signal, which as expected may be calculated by a non-trivial linear combination of all other measured signals, by performing the following:
   stimulating each sensor with a periodic stimulation signal having a predetermined stimulation frequency, the stimulation frequencies of the sensors being orthogonal to one another;
   mixing the sensor signals;
   filtering the stimulation signal of each sensor out of the mixed sensor signal;
   compensating each sensor signal in proportion to the filtered-out stimulation signal;
   reducing the redundancy of the compensated sensor signals; and
   furnishing the output signal.

* * * * *